US009536066B2

United States Patent
Steiner et al.

(10) Patent No.: US 9,536,066 B2
(45) Date of Patent: *Jan. 3, 2017

(54) SYSTEM AND METHOD OF OWNERSHIP OF AN ONLINE COLLECTION

(71) Applicant: Google Inc., Mountain View, CA (US)

(72) Inventors: Matthew Steiner, Los Altos, CA (US); Kevin C. Smilak, Torrance, CA (US)

(73) Assignee: Google Inc., Mountain View, CA (US)

( * ) Notice: Subject to any disclaimer, the term of this patent is extended or adjusted under 35 U.S.C. 154(b) by 136 days.

This patent is subject to a terminal disclaimer.

(21) Appl. No.: 14/558,542

(22) Filed: Dec. 2, 2014

(65) Prior Publication Data

US 2015/0207799 A1    Jul. 23, 2015

Related U.S. Application Data

(63) Continuation of application No. 13/452,191, filed on Apr. 20, 2012, now Pat. No. 8,925,106.

(51) Int. Cl.
| | |
|---|---|
| *G06F 21/31* | (2013.01) |
| *G06F 21/62* | (2013.01) |
| *H04L 29/06* | (2006.01) |
| *H04L 29/08* | (2006.01) |

(52) U.S. Cl.
CPC ........... *G06F 21/31* (2013.01); *G06F 21/6245* (2013.01); *H04L 63/08* (2013.01); *H04L 63/101* (2013.01); *H04L 67/02* (2013.01)

(58) Field of Classification Search
CPC ...................................... G06F 21/31
See application file for complete search history.

(56) References Cited

U.S. PATENT DOCUMENTS

| | | | |
|---|---|---|---|
| 7,870,130 B2 | 1/2011 | Banerjee et al. | |
| 7,970,763 B2 | 6/2011 | Russo | |
| 8,756,247 B2 * | 6/2014 | Kuo | H04L 67/1097 707/694 |

(Continued)

OTHER PUBLICATIONS

Baden et al.; Persona: an online social network with user-defined privacy; Published in: Proceeding SIGCOMM '09 Proceedings of the ACM SIGCOMM 2009 conference on Data communication; 2009; pp. 135-146; ACM Digital Library.*

(Continued)

*Primary Examiner* — Bradley Holder
(74) *Attorney, Agent, or Firm* — IP Spring

(57) ABSTRACT

Methods, systems, and apparatuses, including computer programs encoded on computer-readable media, for providing access to content of a web-based collection, which includes receiving content from at least two users authorized to provide content. A request is received from another user to view content in the web-based collection, the another user not authorized to provide content to the web-based collection. A determination is made as to whether the another user is associated with either of the two users. If so, the another user is enabled to view any content on the web-based collection. If not, the another user is prevented from viewing any content on the web-based collection. The another user is determined to be associated with one of the two users based on the one of the two users selecting the another user as having a relationship to the one of the two users on a social network website.

20 Claims, 14 Drawing Sheets

(56) References Cited

U.S. PATENT DOCUMENTS

| | | | |
|---|---|---|---|
| 2002/0032870 A1* | 3/2002 | Spusta | G06F 17/30867 726/29 |
| 2002/0054090 A1* | 5/2002 | Silva | G06F 17/30905 715/747 |
| 2002/0095387 A1* | 7/2002 | Sosa | G06Q 20/04 705/65 |
| 2002/0101848 A1* | 8/2002 | Lee | H04L 29/06 370/349 |
| 2003/0037250 A1* | 2/2003 | Walker | H04L 63/04 726/6 |
| 2003/0177237 A1* | 9/2003 | Stebbings | G06Q 20/40 709/225 |
| 2003/0182420 A1* | 9/2003 | Jones | G06F 17/30867 709/224 |
| 2004/0064418 A1* | 4/2004 | Koster | H04L 12/2856 705/52 |
| 2004/0243708 A1* | 12/2004 | Stebbings | G06Q 20/40 709/225 |
| 2005/0198031 A1* | 9/2005 | Pezaris | H04L 12/588 |
| 2007/0192156 A1* | 8/2007 | Gauger | G06Q 10/00 705/7.19 |
| 2008/0077595 A1 | 3/2008 | Leebow | |
| 2008/0115227 A1* | 5/2008 | Toutonghi | G06F 21/10 726/29 |
| 2008/0219493 A1 | 9/2008 | Tadmor | |
| 2008/0270425 A1 | 10/2008 | Cotgreave | |
| 2009/0064007 A1* | 3/2009 | Lazier | G06F 17/30884 715/764 |
| 2009/0157693 A1 | 6/2009 | Palahnuk | |
| 2009/0158404 A1 | 6/2009 | Hahn et al. | |
| 2009/0259738 A1* | 10/2009 | Zimmermann | A01K 27/006 709/221 |
| 2009/0307750 A1* | 12/2009 | Marueli | G06F 17/30867 726/3 |
| 2010/0045518 A1 | 2/2010 | Lee et al. | |
| 2010/0229224 A1* | 9/2010 | Etchegoyen | G06F 21/31 726/5 |
| 2010/0287053 A1 | 11/2010 | Ganong et al. | |
| 2010/0299438 A1* | 11/2010 | Zimmerman | H04N 7/17318 709/226 |
| 2011/0038512 A1 | 2/2011 | Petrou et al. | |
| 2011/0158558 A1 | 6/2011 | Zhao et al. | |
| 2011/0167081 A1 | 7/2011 | Kosaka et al. | |
| 2011/0211737 A1 | 9/2011 | Krupka et al. | |
| 2011/0225518 A1 | 9/2011 | Goldman et al. | |
| 2012/0110005 A1* | 5/2012 | Kuo | H04L 67/1097 707/769 |

OTHER PUBLICATIONS

Novotny et al.; An online credential repository for the Grid: MyProxy; Published in: High Performance Distributed Computing, 2001. Proceedings. 10th IEEE International Symposium on; Date of Conference: 2001; pp. 104-111; IEEE Xplore.*

Baden, et al., "Persona: an Online Social Network with User-Defined Privacy", Proceedings SIGCOMM '09, Proceedings of the ACM SIGCOMM 2009 Conference on Data Communication; ACM Digital Library, 2009, pp. 135-146.

Novotny, et al., "An Online Credential Repository for the Grid: My Proxy", High Performance Distributed Computing; Proceedings of the 10th IEEE International Symposium, 2001, pp. 104-111.

* cited by examiner

Email to Fred Johnson:

Hi, Fred. You are invited to view a collection of photos and videos of Mary and Dan's wedding that took place on March 1, 2012. Please check HERE to go to register onto the online collection using your social network username and password. After registering, you can then view content of the collection and upload content to the collection.

FIG. 7A

Email to Amy Johnson:

Hi, Amy. Based on the fact that you are a social network friend of Fred Johnson, you are invited to view a collection of photos and videos of Mary and Dan's wedding that took place on March 1, 2012. Please check HERE to go to register onto the online collection using your social network username and password. After registering, you can then view content of the collection and upload content to the collection.

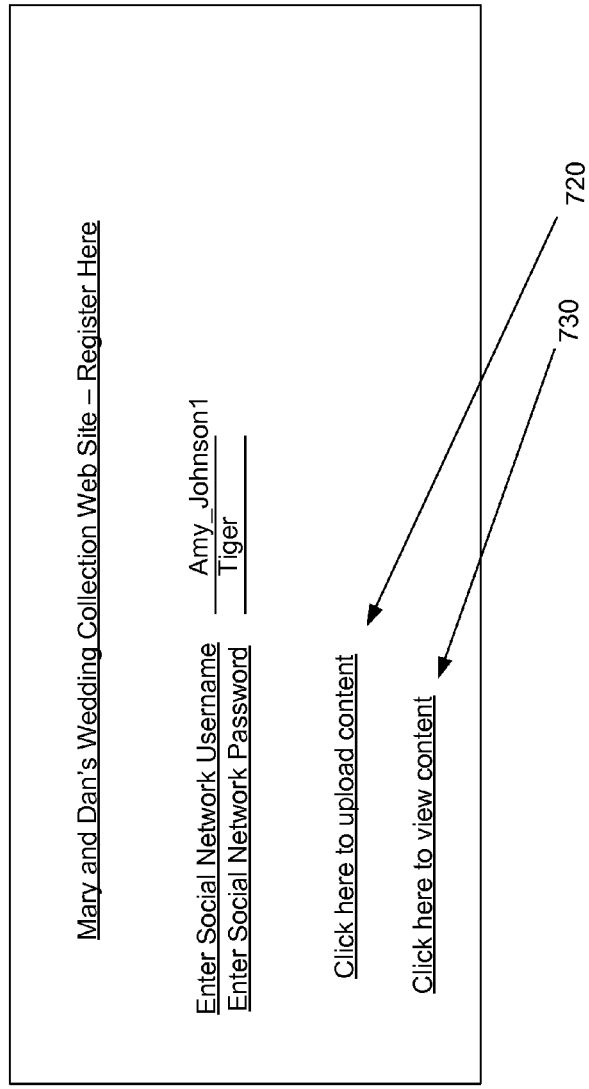

FIG. 7B

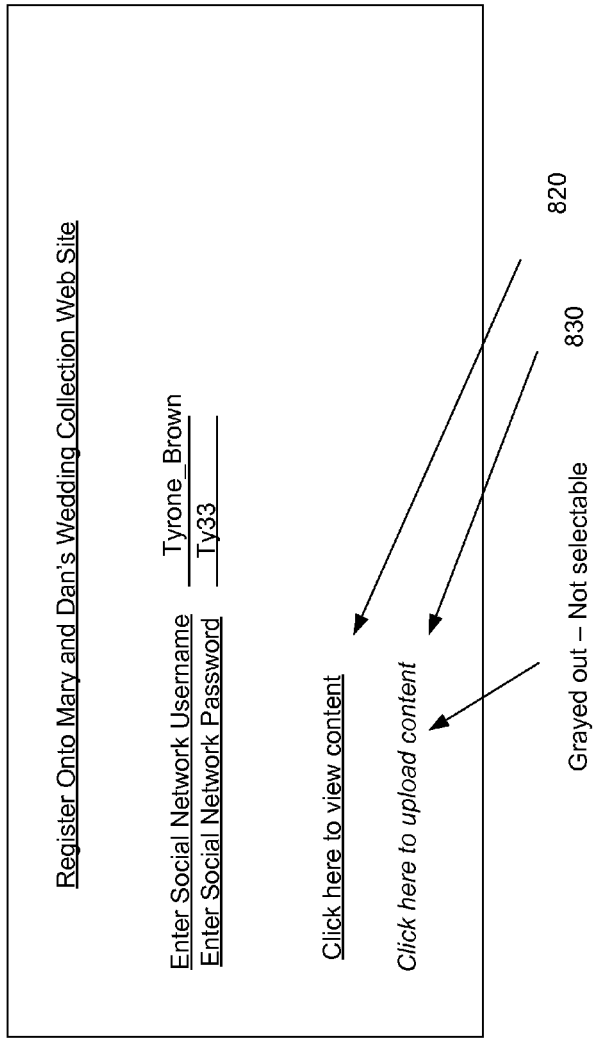

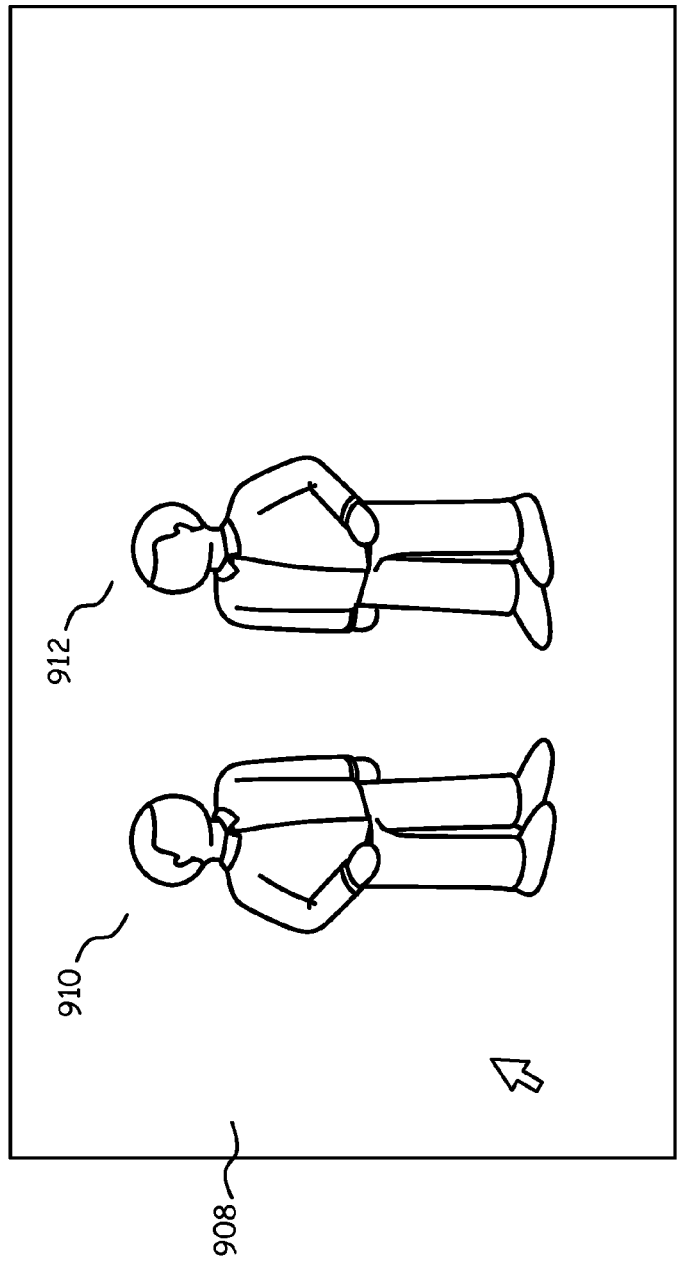

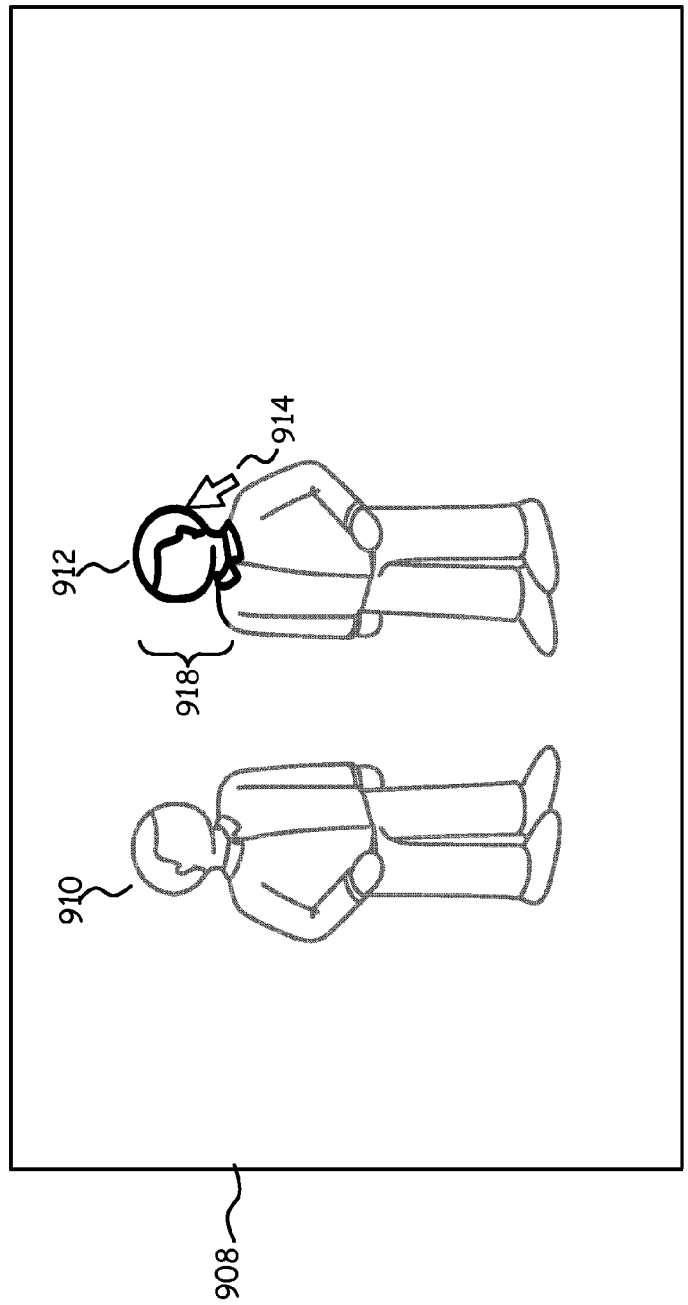

SYSTEM AND METHOD OF OWNERSHIP OF AN ONLINE COLLECTION

CROSS-REFERENCE TO RELATED APPLICATIONS

This application is a continuation of U.S. application Ser. No. 13/452,191 filed Apr. 20, 2012, the disclosure of which is expressly incorporated herein by reference in its entirety.

BACKGROUND

The present disclosure relates generally to online multi-media management. Online social network websites, online photo and/or video sharing websites, rich media sharing web sites, and other online services websites allow users to upload, manage, and view their images, as well as view images of others. In some cases, websites are created within an online social network specifically to memorialize an event, such as a wedding or a birthday. Persons who attended the event can then view a collection of photos, videos, and other types of multi-media of the event that have been uploaded onto the website by other persons who attended the event.

The owner of the online collection website can designate users who are authorized to upload photos onto the website users or view content on the website. However, there may be other users would might be interested in viewing the content on the website and/or uploading content to the website.

SUMMARY

In general, one aspect of the subject matter described in this specification can be embodied in a method of determining which users are allowed to view content into a web-based collection and to view content from the web-based collection, the content including photos and/or videos. The method includes receiving, by a processor as output from an administrator of the web-based collection, a list of users who are authorized to provide content onto the website. The method also includes receiving, by the processor, a request from a first user to provide content to the website. The method includes determining, by the processor, whether the first user making the request is on the list of users, and if so, allowing the first user to provide content to the website; receiving a request from a second user to view content on the website. The method still further includes determining, by the processor, whether the second user is on the list of users or is associated with any user on the list of users. If the determining is that the second user is on the list of users or is associated with any user on the list of users, the method includes allowing the second user to view content on the website, and if not, disallowing the second user to view the content on the website.

Another aspect of the subject matter described in this specification can be embodied in a method of providing access to content of a web-based collection, which includes receiving, by a processor, content from at least two users authorized to provide content to the web-based collection. The method also includes receiving, by the processor, a request from another user to view content in the web-based collection, the another user not authorized to provide content to the web-based collection. The method further includes determining, by the processor, whether the another user is associated with either of the at least two users, and if so, enabling the another user to view any content on the web-based collection, and if not, preventing the another user from viewing any content on the web-based collection. The another user is determined to be associated with one of the at least two users based on the one of the at least two users selecting the another user as having a relationship to the one of the at least two users on a social network website.

Yet another aspect of the subject matter described in this specification can be embodied in a server configured to store a web-based collection. The server includes a determining unit configured to determine whether a user attempting to access the server to thereby access the web-based collection is on a list of users who are allowed to provide content onto the web-based collection or whether the user is associated with a user on the list of users, and if so, enabling access by the user to the web-based collection. The server also includes an access/non-access unit configured to allow access by the user to the web-based collection when the determining unit determines that the user is on the list of users or is associated with a user on the list of users, and to not allow access by the user to the web-based collection when the determining unit determines that the user is not on the list of users and is not associated with a user on the list of users. The server further includes a first storage unit configured to store the list of users, and a second storage unit configured to store the web-based collection. The user requesting access is determined by the server to be associated with one or more users on the list of users based on the one or more users on the list of users having selected the user requesting access as having a relationship to the one or more users on the list of users on a social network website.

BRIEF DESCRIPTION OF THE DRAWINGS

The details of one or more implementations of the subject matter described in this specification are set forth in the accompanying drawings and the description below. Other features, aspects, and advantages of the subject matter will become apparent from the description, the drawings, and the claims.

FIGS. 6A, 7A and 8A are drawings that show representative emails for inviting a user to a web-based collection, in accordance with an illustrative embodiment;

FIGS. 6B, 7B and 8B are drawings that show representative registration pages of a web-based collection website, in accordance with an illustrative embodiment;

FIGS. 9A-9C are drawings of a photo in a web-based collection, to show usage of facial recognition techniques on content of a web-based collection, in accordance with an illustrative embodiment;

Like reference numbers and designations in the various drawings indicate like elements.

DETAILED DESCRIPTION

Users of online social network sites, online photo management sites, and other online systems frequently upload and view photos as well as view photos uploaded by other users. One or more embodiments provide for determining which users can access a web-based collection of photos, videos, etc.

In some embodiments, a list of users who may view a collection of photos may comprise a union of lists of authorized viewers of each person contributing to the collection.

In some embodiments, a community group comprising a plurality of users may be an owner or administrator of a collection of photos, each of the members of the group having configurable privileges (e.g., add photos, delete photos, view photos, message members, etc.). The community group may have different levels of members, such as a first level of members who are administrators and a second level of members who are regular members, the administrators having a larger set of privileges than the regular members.

Although the various examples provided in the present disclosure are directed towards online systems (e.g., online social network website) capable of content management, the disclosed methods can be used by any other types of systems in order to facilitate communication between a website and one or more user devices requesting access to the website.

Figure 1:
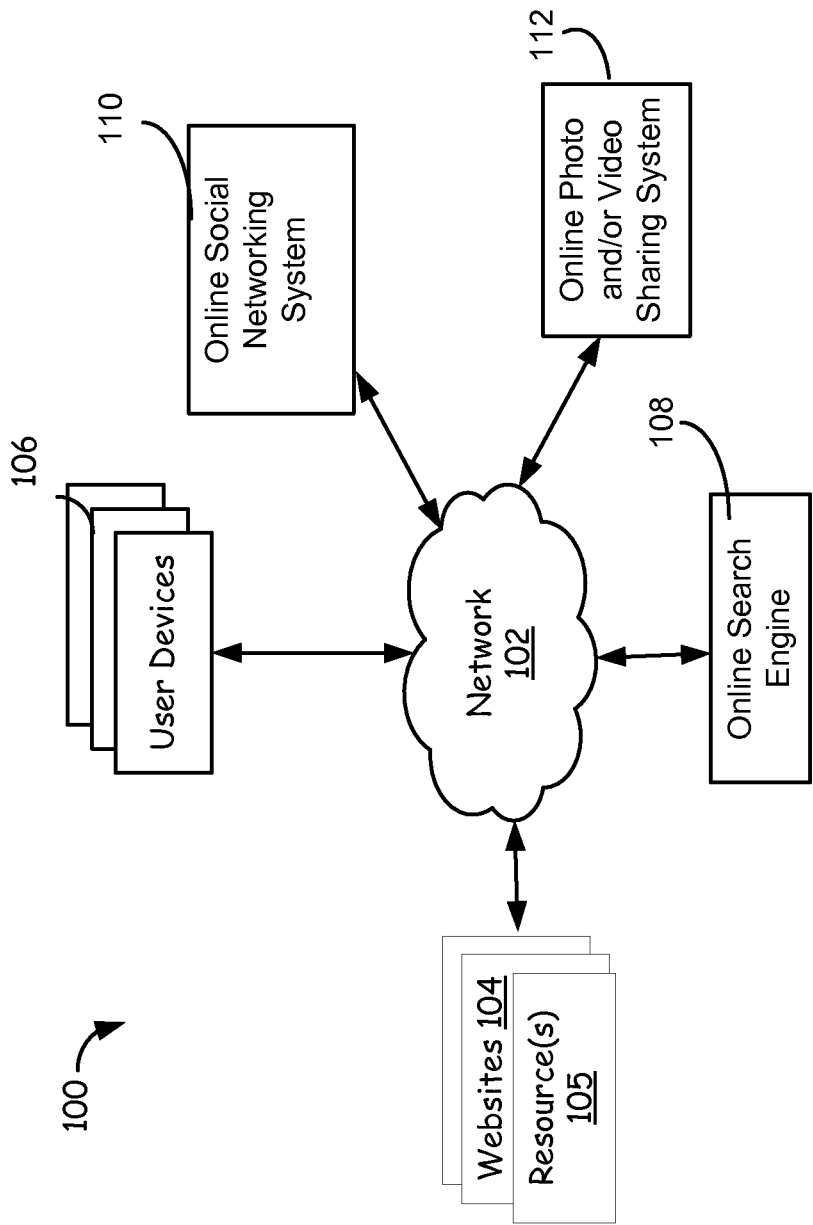
FIG. 1 illustrates a block diagram of an example environment in which user devices access a web-based collection, in accordance with an illustrative embodiment.

FIG. 1 is a block diagram of an example environment 100 in which user devices 106 utilize photo management services and search engine services of online systems. The example environment 100 includes a network 102, such as a local area network (LAN), a wide area network (WAN), a wireless network, the Internet, a cellular network, a radio network, a satellite network, or a combination thereof. The network 102 connects websites 104, user devices 106, an online search engine 106, an online social network system 110, and an online photo sharing and/or video sharing system 112. The environment 100 may include any number of websites 104, user devices 106, and various online systems providing online services to the user devices 106.

Each website 104 includes one or more resources 105 associated with a domain name and hosted by one or more servers. An example website is a collection of web pages formatted in hypertext markup language (HTML) that can contain text, images, multimedia content, and/or programming elements, such as scripts.

The resource 105 is any data that can be provided over the network 102. The resource 105 is identified by a resource address that is associated with the resource 105, such as a URL. Resources 105 can include web pages, word processing documents, portable document format (PDF) documents, images, video, programming elements, interactive content, and feed sources, to name only a few. Resources 105 can include content, such as words, phrases, images and sounds, that may include embedded information (such as meta-information in hyperlinks) and/or embedded instructions. Embedded instructions can include code that is executed at a user's device, such as in a web browser. Code can be written in languages, such as, JavaScript® or ECMAScript®.

A user device 106 is an electronic device that is under the control of a user. The user device 106 is configured to request and receive resources 105 over the network 102. Example user devices 106 include personal computers, mobile communication devices (e.g., cellular telephone, smart phone, etc.), and other computing devices (e.g., having a processor and memory or other type of computer-readable medium) that can send and receive data over the network 102. In some embodiments, the user devices 106 may include a user application, such as a web browser, to facilitate the sending and receiving of data over the network 102. In other embodiments, the user devices 106 may include an application (e.g., phone application) for communication with online systems (e.g., systems 110 and 112).

The user devices 106 can request resources 105 from a website 104. In turn, data representing the resource 105 can be provided to the user device 106 for presentation by the user device 106 (e.g., on an electronic display, as an audible sound via a speaker, or a combination thereof).

The online social network system 110 can include a website 104 storing a collection of photos, videos, etc., memorializing a particular event. System 110 may be configured to store relationships between users, such as "friends," "family," "work friends," etc., and to limit the sharing of messages, photos and other content based on these pre-stored relationships. Using the system 110, users can create and share albums of photos with some or all of their friends. For example, users can select people to share particular content with (e.g., select certain friends to share photos with).

The online photos sharing system 112 can also include a website 104 that allows users to share photos uploaded onto a web-based collection. Using the resources 105 associated with the website 104 of the online social network system 110 or the online photo sharing and/or video sharing system 112, users can upload, view, delete, edit, send to printer, "auto-fix," and otherwise manage photos and videos. Users can tag images with tags describing contents of the images. For example, a tag can include a name of a person displayed in the image and can further comprise a hyperlink to the person's profile page or profile data.

One or more processors in communication with a display may execute a software application, such as a web browser. The web browser operates by receiving input of a resource name or network address into a field, such as a web address, from an input device (e.g., a pointing device, a keyboard, a touchscreen, etc.). In response, one or more processors associated with the user device and executing the web browser may request data over a network (e.g., the Internet, an intranet, etc.) from a content source corresponding to the resource name or network address. The content source may provide webpage data and/or other data to the user device which is used to cause visual indicia to be displayed to the user.

In general, webpage data may include photos, text, hyperlinks, layout information, and other data. In some implementations, webpage data may be one or more files in a markup language, such as the hypertext markup language (HTML), extensible HTML (XHTML), extensible markup language (XML), or any other markup language. The webpage data may include data that specifies where indicia appear on the webpage, such as an image or other visual objects. In some implementations, the webpage data may also include additional information used by the user device to retrieve additional indicia displayed on webpage. For example, the file may include network address information for the location of the image.

An exemplary embodiment of the invention for controlling access to content on a web-based collection is described in detail below. The web-based collection may be directed to or otherwise associate with a specific event, such as a wedding, or a birthday party, for example. In order to control who can and cannot upload content to the web-based collection, a list of users is set, such as by an administrator of the web-based collection. The list of users can be, for example, users who attended a particular event that is the basis of the web-based collection, such as persons on the wedding invitation list. Each user on the list of users is granted the authority to upload content, such as still photos, videos, audio files, etc., for others to peruse on that website. The web-based collection may have two sets of users: a first set of users being those who can upload content and also view content, and a second set of users being those who can only view content. The setting of which users are in the first and second sets of users can be made by the administrator of the web-based collection, or some other person with sufficient authority to grant those privileges. The administrator of the web-based collection may also grant "visitors", those being persons who are not registered onto a social network website on which the web-based collection is a part of (and thus anonymous with respect to the web-based collection), to be able to view content on the web-based collection, or not to be able to view the content.

Figure 2:
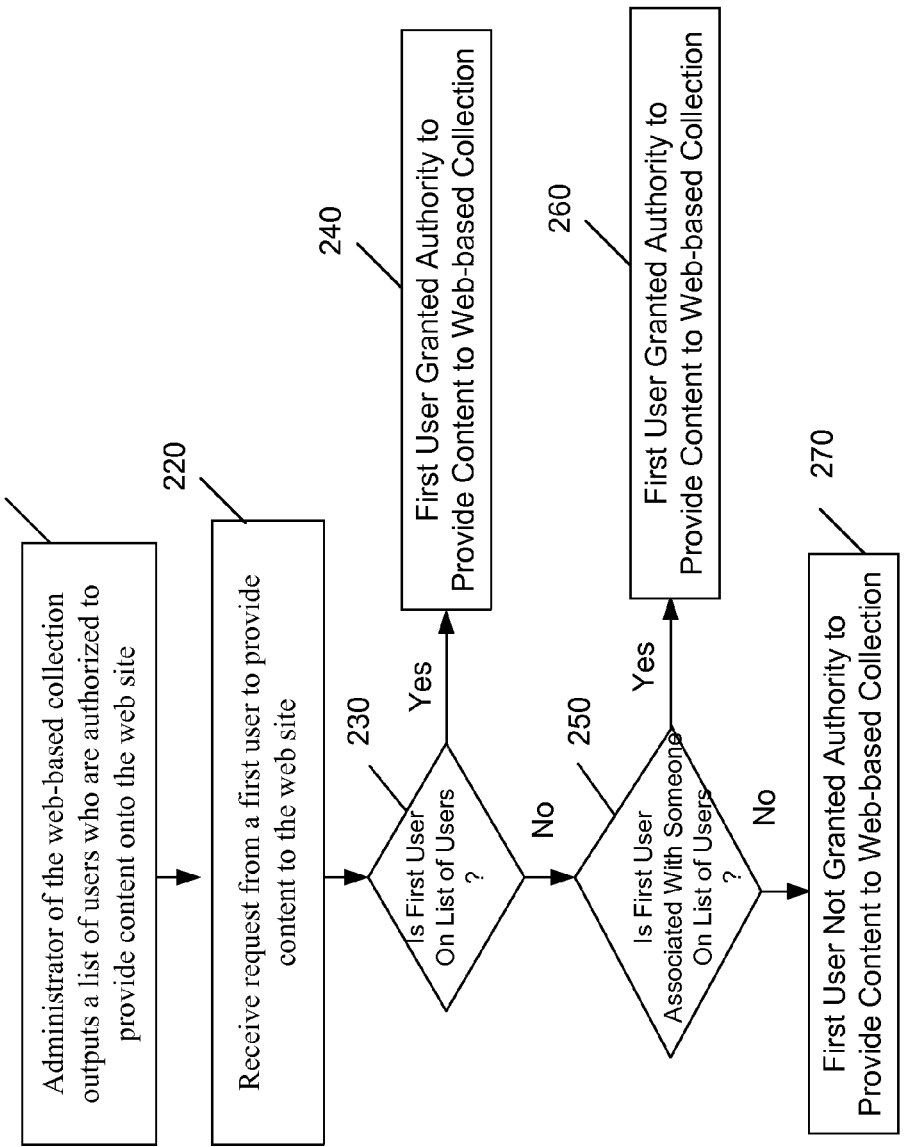
FIG. 2 is a flow diagram of an example process for determining access to a web-based collection, in accordance with an illustrative embodiment.

Referring now to FIG. 2, a method according to an exemplary embodiment is described for determining which users are allowed to upload content into a web-based collection. In a first stage 210, an administrator of the web-based collection outputs or creates a list of users who are authorized to provide content onto the website, which list is stored in computer memory. In one example, the list can be typed into a computer or imported from another website (e.g., a wedding or other event website). In a second stage 220, a request is received from a first user to provide content to the website. In a third stage 230, a determination is made as to whether the first user making the request is on the list of users. If Yes, in a fourth stage 240, the first user is granted authority to provide content to the website. If No, in a fifth stage 250, it is determined if the first user is associated with any user on the list of users. The first user is associated with another user if the first user is designated as a friend or family of the other user on a social network, in one possible implementation. The first user is associated with another user if the first user has signed up with a particular social network group (e.g., a bass fishing group) that the other user is also signed up with, in another possible implementation.

If the first user is associated with any user on the list of users, in a sixth stage 260, the first user is granted authority to provide content to the website, or just to view content on the website, depending upon predetermined settings made by the administrator of the web-based collection. If the first user is not associated with any user on the list of users, in a seventh stage 270, the first user is not granted authority to either view content on the web-based collection or provide content to the web-based collection.

Figure 3:
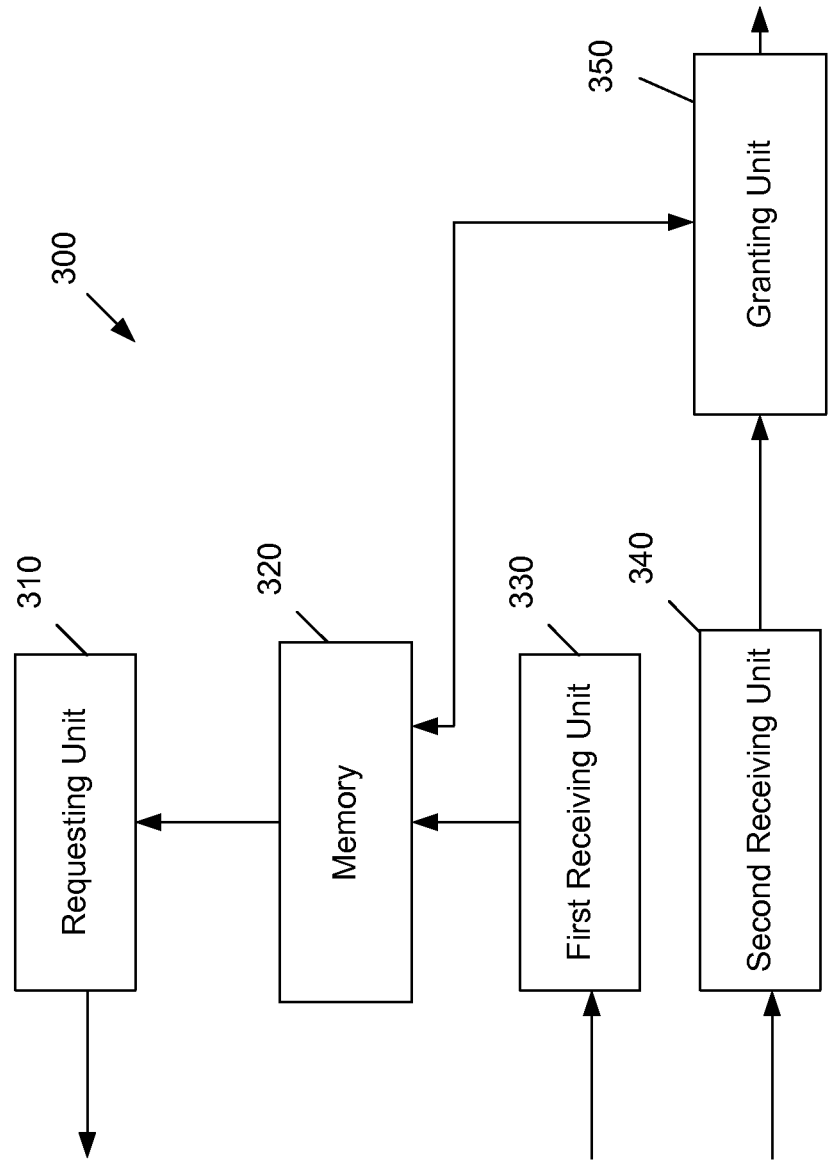
FIG. 3 is a block diagram of a web-based collection access determining apparatus in accordance with an illustrative embodiment.

FIG. 3 is a block diagram of a system 300 for granting or not granting access to a web-based collection, according to some embodiments. On an online social network, registered users associate with other users on the online social network, by assigning those other users as "friends" or "family" within the online social network. Once this is done, the users can exchange messages, content and the like privately, without others (non-friends and non-family) being able to access the content. In one embodiment, if a user is on a list of users authorized to view content and provide content to a web-based collection, then all persons associated with that user, those being persons who have been assigned by the user as a friend or family designation on the online social network, are also granted authorization to view content on the web-based collection. Also, based on a setting made by the administrator of the web-based collection, the associated users may also be granted authority to upload content onto the web-based collection.

For each user who is on a list of users stored in a memory 320, a requesting unit 310 requests information as to all friends and family members (or other social contacts) on the social network with respect to each user on the list of users. The request can be made, for example, by querying a social network administration website for that information. A first receiving unit 330 receives information from the social network administration website regarding the requested information, and updates information in the memory 320 regarding who is authorized to view content in the web-based collection and/or upload content to the web-based collection. In some instances, depending upon a setting made by the administrator of the web-based collection, a friend-of-a-friend of a user on the list of users, a friend-of-a-family-member of a user on the list of users, etc., those being users twice removed from a user on the list of users, may be authorized to view content on the web-based collection and/or upload content to the web-based collection. The degree of association can be set by the administrator of the web-based collection to be any integer number, such as one, two, three, etc. A second receiving unit 340 receives a request from a user desiring access to the web-based collection, and based on the information in the memory 320, that request is either granted or not granted by a granting unit 350.

Figure 4:
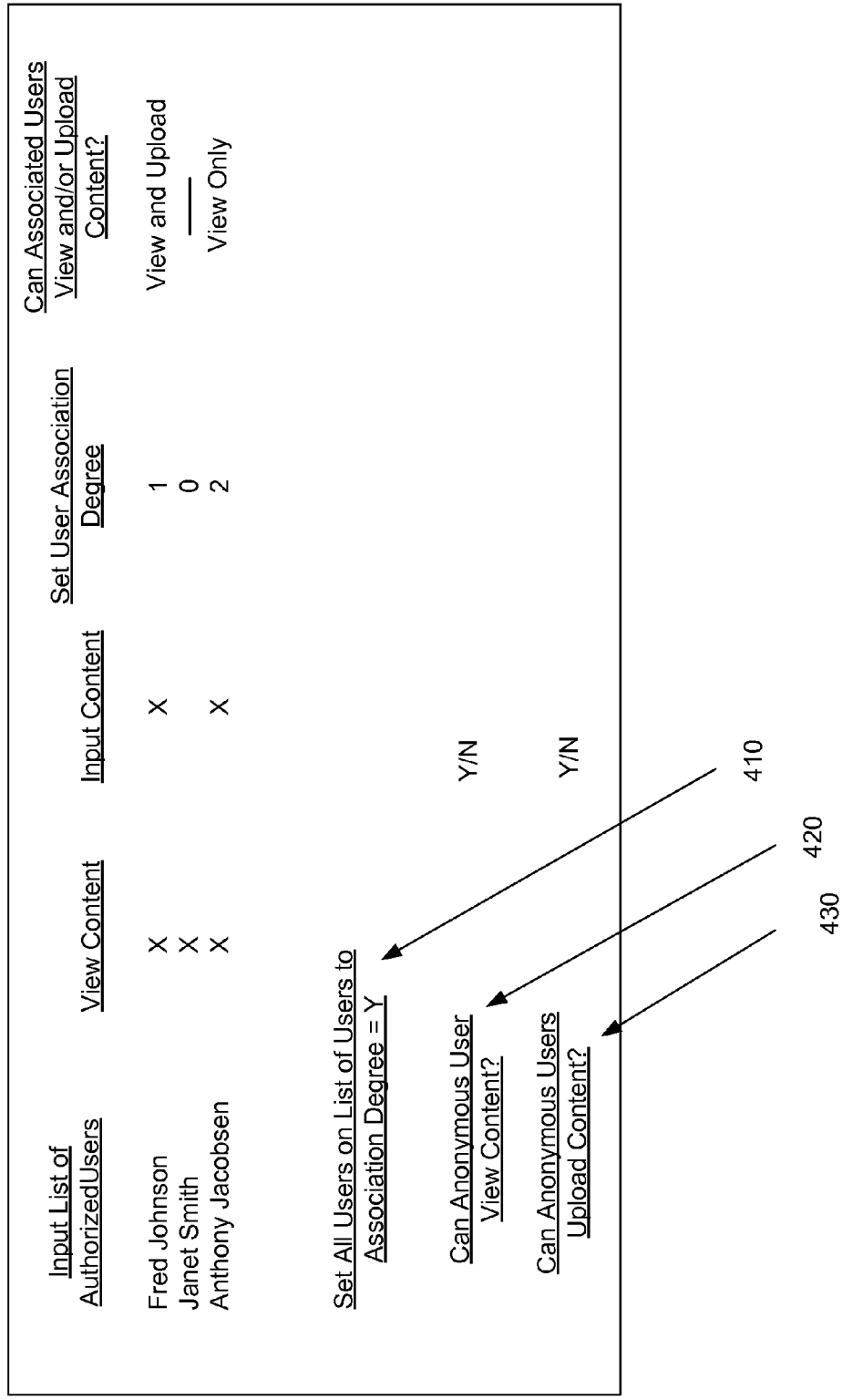
FIG. 4 illustrates a graphical user interface screen that can be used by an administrator for determining which users are to be granted access to a web-based collection, in accordance with an illustrative embodiment.

FIG. 4 shows a graphical user interface (GUI) screen 400 that an administrator of the web-based collection may utilize to set the various degrees of association for accessing the web-based collection, according to some embodiments. A list of authorized users is provided, whereby that list of users can be obtained from the memory 320 (see FIG. 3) and/or entered onto the GUI screen 400 by the administrator. For each user on the list of authorized users, the administrator inputs a setting as to whether that user can only view content, or can view and input content. Also, for each user on the list of authorized users, the administrator inputs a value corresponding to the degree of association with respect to others users to be allowed access to the web-based collection. Based on the settings shown in FIG. 4, social network friends of Fred Johnson are allowed to view and upload content with respect to the web-based collection, and friends and friends-of-friends of Anthony Jacobsen are allowed to view (but not upload) content with respect to the web-based collection. The social network friends of Janet Smith are not provided access to the web-based collection, unless they are already on the authorized list of users or are a friend of another user for which access has been granted for his/her social network friends by the administrator. The GUI screen 400 of FIG. 4 also includes a setting 410 that allows the administrator to set all users on the list of authorized users to have a particular user association degree (e.g., 0, 1, 2), as a one-click operation. Further, the GUI screen 400 includes a Yes/No setting 420 that allows the administrator to allow or not allow anonymous users (e.g., those users who have not logged onto the social network website and/or who have disabled their browser cookies) to view content on the web-based collection, and a Yes/No setting 430 that allows the administrator to allow or not allow anonymous users to upload content onto the web-based collection. In some embodiments, a single administrator or the creator of the web-based collection can designate a set of administrators to perform the functions described above.

Figure 5:
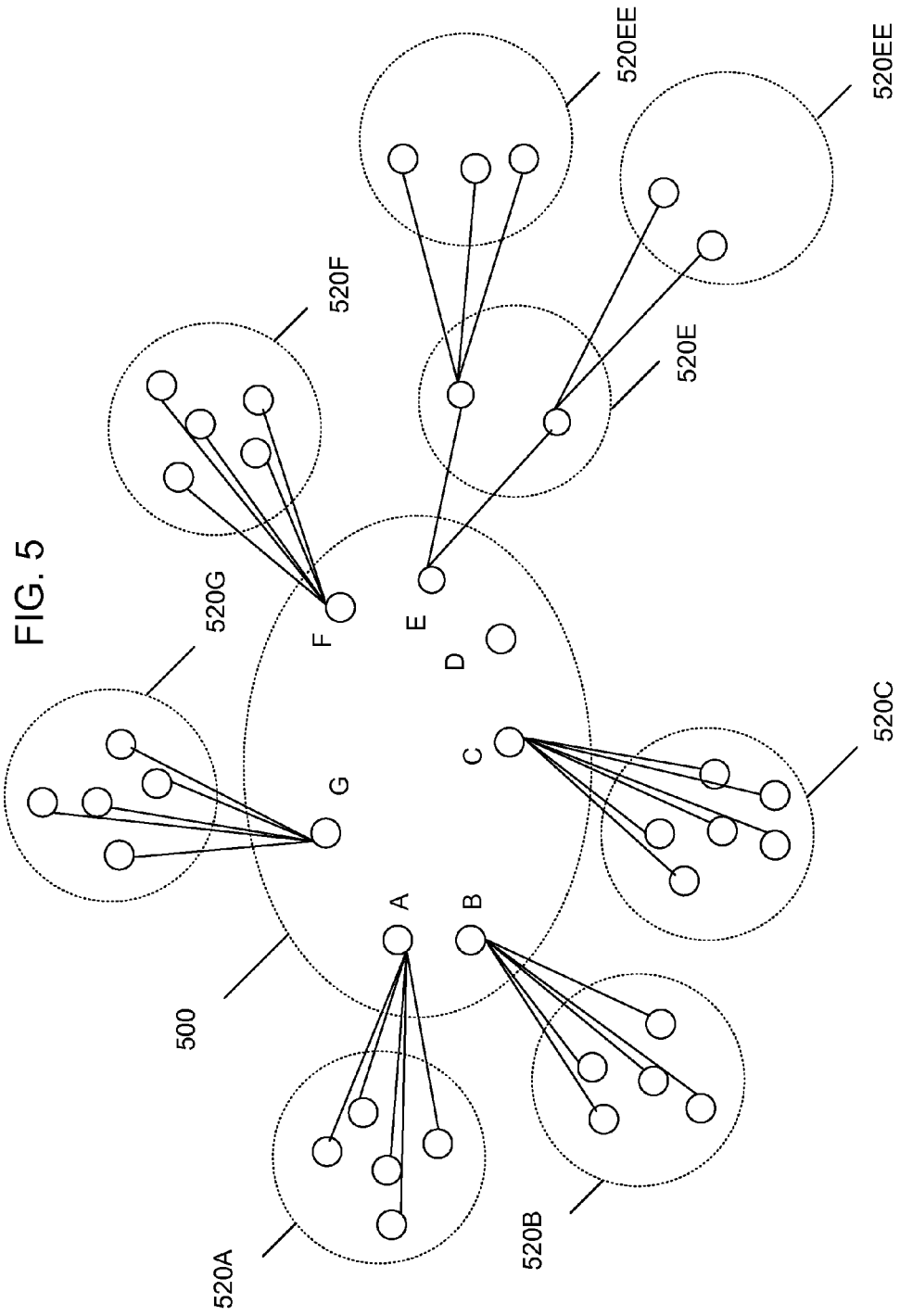
FIG. 5 is a diagram showing the 'federated' nature of access to a web-based collection, in accordance with an illustrative embodiment.

Referring now to FIG. 5, which shows a federated ownership concept in a diagrammatic form, the list of authorized users is shown by way of users A, B, C, D, E, F and G—within circle 500. Users A, B, C, F and G have their respective association degrees set by the administrator (by using the GUI screen 400 of FIG. 4, for example) to one, to thereby provide access to the web-based collection to social network friends of those users, as shown by the dots within circles 520A, 520B, 520C, 520F and 520G. The setting for user D is such that social network friends of that user are not provided access to the web-based collection. The setting for user E is such that the social network friends of user E (those within circle 520E) and the social network friends-of-friends of user E (those within circle 520EE) have been provided access to the web-based collection.

Figures 6A, 6B:
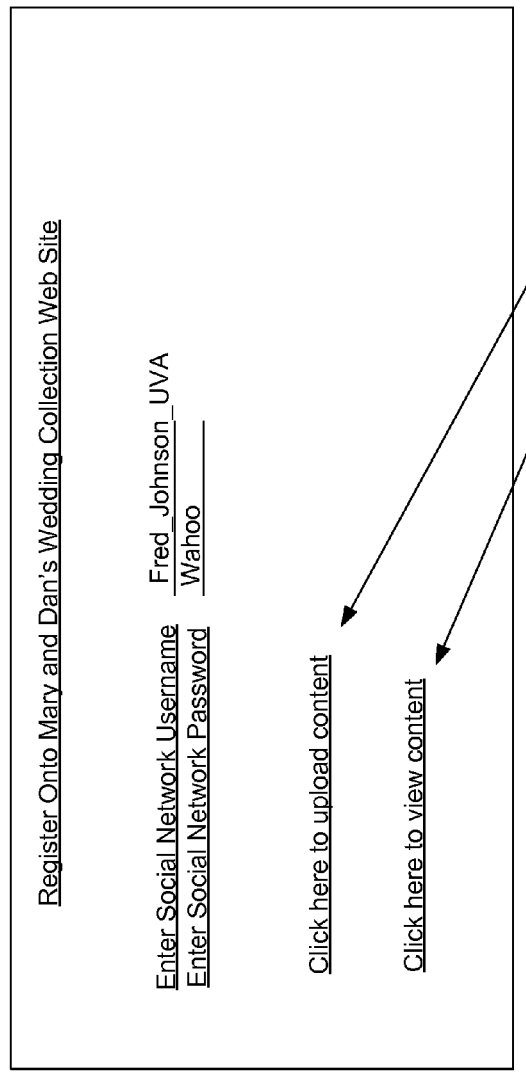

FIGS. 6A and 6B show how a user can be notified of access to content of the web-based collection, according to some embodiments. FIG. 6A shows a representative email 600 that can be sent to an authorized user, which notifies the user of the basis of the web-based collection (e.g., a wedding photo and video collection, a birthday photo and video collection), as well as how to access the web-based collection. When the user clicks on the "HERE" link in the email, the user is sent to a registration page of the web-based collection, whereby a representative registration page 610 is shown in FIG. 6B. The user can then register on the web-based collection by entering his/her social network username and password, to ensure that someone other than the user cannot access the web-based collection just by having access to the email 600 shown in FIG. 6A. Once the user has completed the registration process, the user can then view content by clicking on link 630, or upload content by clicking on link 620. In some embodiments, two types of email tokens are used, one which is consumable (single-use) and one which is multi-use and can be passed from user to user. For example, if the email 600 is a single use email, then only the designated recipient of that email can register onto the web-based collection to upload content. If the email 600 is a multi-use email, then the designated recipient of that email can forward the email 600 to other users, whereby those other users can then elect to register onto the web-based collection to upload content. In essence, the single-use email includes a single token that grants access to the web-based collection to a single user, whilst the multi-use email includes multiple tokens to grant access to the web-based collection to multiple users who receive the email 600. With the multi-use email embodiment, users who are contributors to the web-based collection can add others as contributors or viewers to the web-based collection, by simply forwarding the email 600 to those other users.

FIGS. 7A and 7B show how a user who is a friend or someone on the list of authorized users can be notified of access to content of the web-based collection, according to some embodiments, in which this user is allowed to view content and to upload content to the web-based collection. FIG. 7A shows a representative email 700 that can be sent to a friend of an authorized user, which notifies the user of the reason why he/she is getting this email ("friend of Fred Johnson"), of the basis of the web-based collection (e.g., a wedding photo and video collection, a birthday photo and video collection), as well as how to access the web-based collection. When the user clicks on the "HERE" link in the email 700, the user is sent to a registration page of the web-based collection, whereby a representative registration page 710 is shown in FIG. 7B. The user can then register on the web-based collection by entering his/her social network username and password, to ensure that someone other than the user cannot access the web-based collection just by having access to the email shown in FIG. 7A. Once the user has completed the registration process, the user can then view content by clicking on link 730, or upload content by clicking on link 720.

When a user uploads content onto the web-based collection, that user can later on choose to remove the content, such as by registering on the website containing the web-based collection and electing to remove some or all of the content uploaded by the user. The web-based collection keeps track of which users uploaded which content, and so that at a later point in time those users can choose to remove the content from the web-based collection if they see fit. Also, if a user is granted access to the web-based collection, that user is granted access to the entirety of the web-based collection. By way of example, if a web-base collection of a wedding includes a first folder of photos/videos of the wedding at a Church, and a second folder of photos/videos of a reception that followed the wedding, and a third folder of photos/videos of a honeymoon of the bride and groom, a user granted access to the web-based collection is granted access to content in each of the first, second and third folders or albums. Folders or albums can be organized into a collection comprising a plurality of folders or albums.

FIGS. 8A and 8B show how a user who is a friend or someone on the list of authorized users can be notified of access to content of the web-based collection, according to some embodiments, in which this user is allowed to only view content of the web-based collection. FIG. 8A shows a representative email 800 that can be sent to a friend of an authorized user, which notifies the user of the reason why he/she is getting this email ("friend of Anthony Jacobsen"), of the basis of the web-based collection (e.g., a wedding photo and video collection, a birthday photo and video collection), as well as how to access the web-based collection. When the user clicks on the "HERE" link in the email 800, the user is sent to a registration page of the web-based collection, whereby a representative registration page 810 is shown in FIG. 8B. The user can then register on the web-based collection web page or site by entering his/her social network username and password, to ensure that someone other than the user cannot access the web-based collection just by having access to the email 800 shown in FIG. 8A. Once the user has completed the registration process, the user can then view content by clicking on link 820, whereby the link 830 for uploading content is grayed out and cannot be enabled by the user. This is because the friends of Anthony Jacobsen are only allowed to view content, as seen by way of the settings in the GUI screen 400 of FIG. 4.

Each user on the list of users is a "federated" owner of the web-based collection to the extent that each user has access to all content uploaded on the web-based collection, and each user can decide to remove part or all of the content previously uploaded by the user. The "federated ownership" signifies that persons "associated" with the authorized persons to upload photos/videos, such as friends/family members set by the authorized users on the social network website, can also view the photos/videos on the photo/video collection website and even upload photos that they may have taken that are relevant to the photo/video collection website (e.g., a wedding website that has photos/videos of a wedding of Mary and Dan). Thus, if two persons are on the list of persons authorized to upload photos, then friends/family members of both of those persons are also authorized to view the photos, and they may also be authorized to upload photos (for example, if a friend/family member of an authorized person was at the event, based on facial recognition match and/or GPS/time information match, as discussed below with respect to other embodiments). In various embodiments, the authorized user (e.g., a user who has uploaded content onto the web-based collection) shares the entire web-based collection with other users (e.g., social network friends of the authorized user, or users who have been forwarded an invite email originally sent to the authorized user), in a manner as explained hereinabove.

In some embodiments, for cases in which the web-based collection cannot obtain access from an administrative website of an online social network regarding friends/family of users on the list of users authorized to upload content, due to security issues, the web-based collection may query each user on the list of users for that information. When a user on the list of authorized users provides information as to users associated with that user, the web-based collection updates its user authorization data accordingly. If a user on the list of users does not provide that information, then social network friends/family members of that user on the list of users are not provided access to the web-based collection, due to the web-based collection not being able to determine friend/family 'associations' with respect to that user on the list of users.

In some embodiments, an administrator or someone of sufficient authority of the web-based collection may provide a setting for certain users on the list of users so as to allow users directly associated with those certain users on the list of users to be able to view and/or upload content onto the web-based collection. The administrator may provide a setting for other users on the list of users so as to allow users associated with those other users via a two-degrees-of-association connection to be able to view and/or upload content onto the web-based collection. The administrator of the web-based collection may provide a setting for still other users on the list of users so as to not allow any associated users of those other users to be able to view and/or upload content onto the web-based collection (see FIG. 5 that shows a zero-degree-of-association user D, one-degree-of-association users A, B, C, F, G, and two-degrees-of-association user E). The settings of who is in each of the above groups can be made by the administrator of the web-based collection or someone with sufficient authority to make such decisions for the web-based collection, such as by using the GUI screen 400 of FIG. 4.

For example, the bride and groom of a wedding that is the subject of a web-based collection may have a setting provided for them such that their associated users have a two- or more association degree with respect to the bride and groom, while family members attending the wedding may have a setting provided for them such that their associated users have a single association degree, while non-family guests at the wedding may have a setting provided for them such that none of their associated users have access to the content in the web-based collection.

Besides having access to content of the web-based collection based on being on a list of authorized users or being associated with someone on the list of authorized users, in some embodiments, facial recognition techniques are utilized to determine which persons attended an event that is the basis of the web-based collection, and to invite those persons to view the content and/or to upload content to the web-based collection.

Figure 9B:
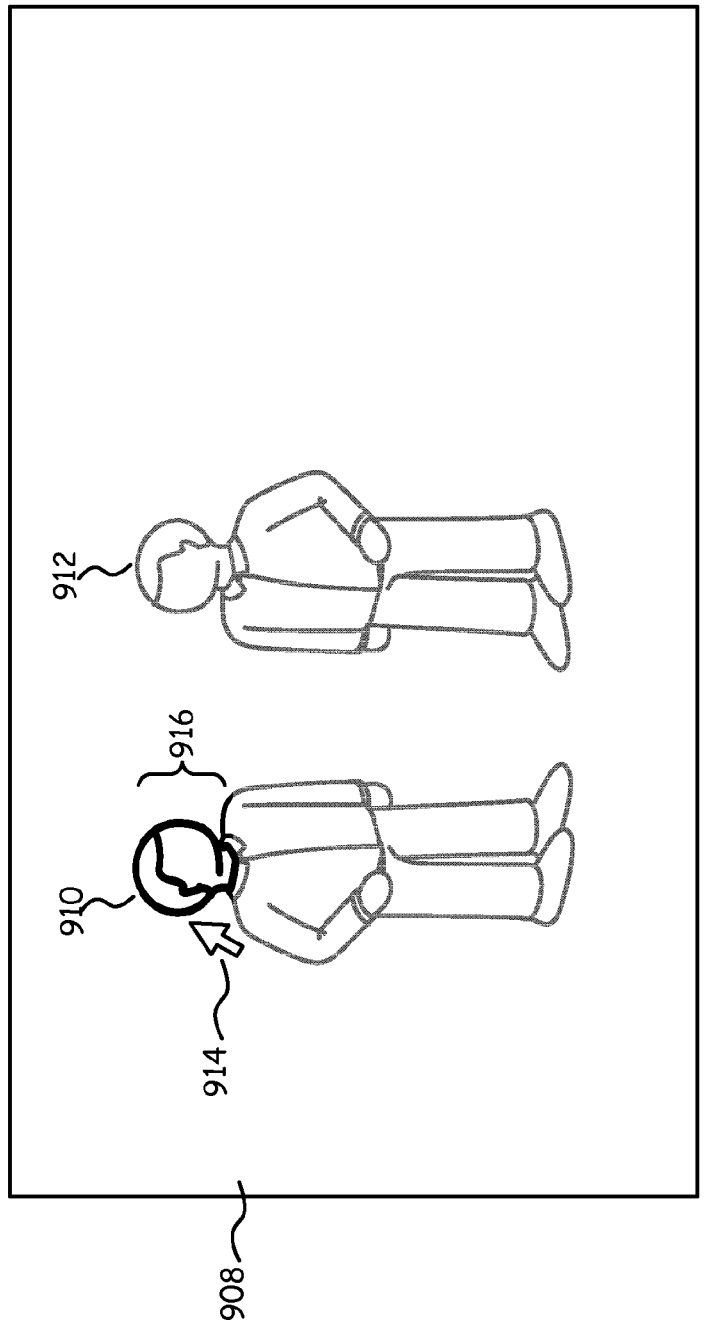

FIG. 9A shows a single photo 908 that is a part of a web-based collection, in which two persons 910, 912 are in the photo. In some embodiments, the existence of persons and their respective facial areas in the photo 908 is determined, such as by using image processing software. Once the existence of persons 910, 912 is determined in the photo 908, the head areas 914 are determined (e.g., based on a priori knowledge of sizes and image characteristics of human heads), and then the facial areas 916, 918 of each person is determined by using image processing software. FIGS. 9B and 9C respectively show in bold lines the determination by image processing software of the facial areas 916, 918 of the persons 910, 912 within the photo 908.

Based on the facial areas 916, 918, facial parameters are obtained for each person 910, 912, such as by using digital image processing techniques. The obtaining of facial parameters may be done in a manner akin to how fingerprint data is obtained from fingerprint images, using predetermined techniques to assign facial parameters to a facial image. Based on the facial parameters obtained, a database of facial information is accessed to determine if there are any matches to persons within that database. The database may contain data about users of a social network website or photo and/or video sharing website, and may contain data for at least one photograph known to be a photograph of a particular user. If there is a match, then that person is flagged as someone who may have attended the event, and an invitation to either view content and/or upload content to the web-based collection associated with that event is sent to that person, such as by way of an email.

In some embodiments, time and location information associated with persons can be used to determine whether or not one or more of those persons attended an event that is the basis of a web-based collection, and if so, to send those persons an invitation to either view content of the web-based collection, or view content and also upload content to the web-based collection.

Figure 10:
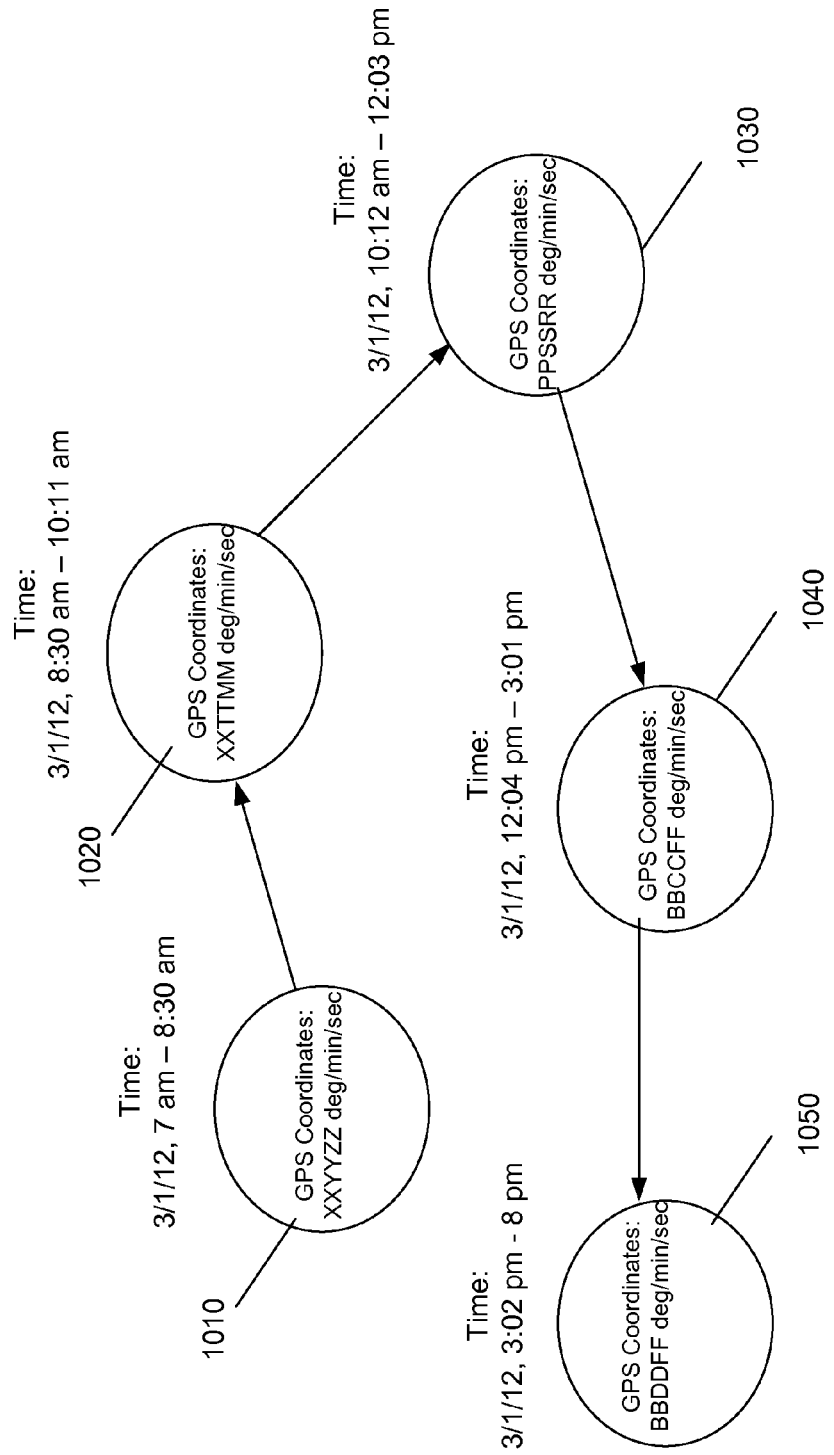
FIG. 10 is a drawing that shows a time and location timeline for use in determining whether or not a user attended an event, in accordance with an illustrative embodiment.

Time and location information can be obtained, for example, from an electronic device carried by a user, such as a cellular telephone. Referring now to FIG. 10, between 7 a.m. to 8:30 a.m. on Mar. 1, 2012, a user was at location 1010 corresponding to GPS coordinates XX/YY/ZZ deg/min/sec. The user then moved to location 1020 corresponding to GPS coordinates XX/TT/MM and stayed there from 8:30 a.m. to 10:11 a.m. The user then moved to location 1030 corresponding to GPS coordinates PP/SS/RR and stayed there from 10:12 a.m. to 12:03 p.m. The user then moved to location 1040 corresponding to GPS coordinates BB/CC/FF and stayed there from 12:04 p.m. to 3:01 p.m. The user then moved to location 1050 corresponding to GPS coordinates BB/DD/FF and stayed there from 3:02 p.m. to 8:00 p.m.

Based on the above information, it can be determined whether or not the user was at a particular event, e.g., Mary and Dan's wedding that took place at location BB/CC/FF between 1 p.m. and 3 p.m. on Mar. 1, 2012, by comparing the time/GPS coordinates information of each person with predetermined time/GPS coordinates information associated with the event in question that is the basis of the web-based collection. If there is a match, then that person is notified, such as by an email, of the web-based collection and the opportunity for the user to view content and/or upload content to the web-based collection.

In some embodiments, both time/GPS coordinate information and photo/video facial data is used to determine the probability that a person attended an event. For example, if, based on the facial data obtained from a photo such as the one shown in FIGS. 9A-9C, a particular user has been identified to be in a particular photo uploaded onto the web-based collection, the time/GPS coordinates information of that particular user is obtained (if available) to determine if that user was at the same location at the same time the event occurred. That way, a fairly definitive determination can be made as to whether the particular user attended the event in question, and thus whether or not to send an email invitation to that user. If only one of the two bases for determining whether a user attended an event results in a match, than a different email can be sent to those users, stating that it is possible that the user attended the event, and to request the user to provide some proof of attendance, such as providing information as to others who attended the same event. Based on that additional information, the user can then be authenticated or not with respect to viewing content and/or uploading content to the web-based collection.

Figure 11:
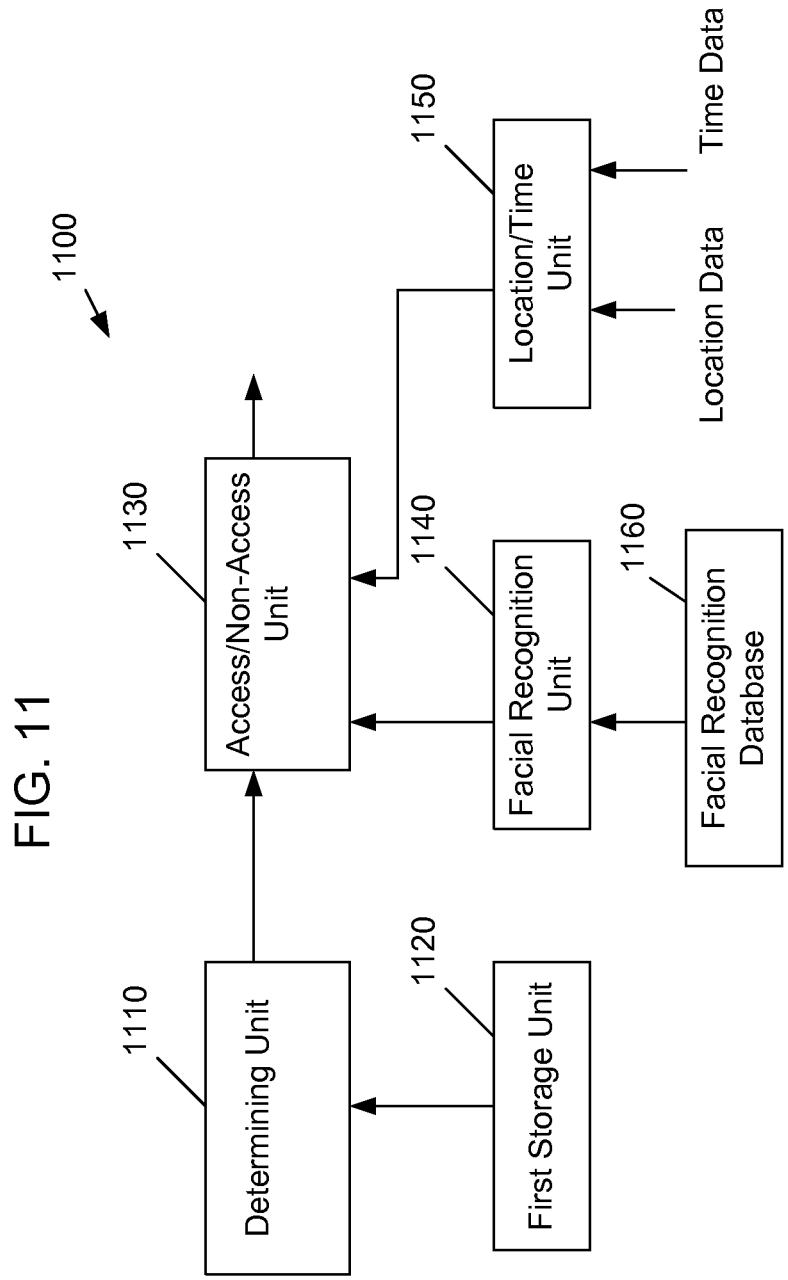
FIG. 11 is a block diagram of a web-based collection access determining apparatus in accordance with another illustrative embodiment.

FIG. 11 is a block diagram of a server 1100 that performs web-based collection management according to one or more embodiments. A server 110 includes a determining unit 1110 that determines whether a user attempting to access the server 1100 to thereby access the web-based collection is on a list of users who are allowed to provide content onto the web-based collection or whether the user is associated with a user on the list of users, and if so, enables access by the user to the web-based collection. The list of users is stored in a first storage unit 1120 accessible by the determining unit 1110. The server 1100 includes an access/non-access unit 1130 that allows access by the user to the web-based collection when the determining unit 1110 determines that the user is on the list of users or is associated with a user on the list of users, and that does not allow access by the user to the web-based collection when the determining unit 1110 determines that the user is not on the list of users and is not associated with a user on the list of users. The user requesting access is determined by the access/non-access unit 1130 to be associated with one or more users on the list of users based on the one or more users on the list of users having selected the user requesting access as having a relationship to the one or more users on the list of users on a social network website. The 'relationship' may be that the user requesting access is a social network friend of a user on the list of users, as explained in detail with respect to some embodiments. The access/non-access unit 1110 may also receive input from a facial recognition unit 1140 and a GPS/time unit 1150, for determining whether or not to grant the user access to the web-based collection. The facial recognition unit 1140 access a facial recognition database 1160 of facial parameters of known users, in order to determine whether or not any of those users match facial recognition parameters of a user in a photo or video on the web-based collection. The location/time unit 1150 receives location data and time data from a cellular network (as obtained from cell phones within the cellular network outputting such data), for determining whether or not a user may have been in the same place and time as an event that is the basis of the web-based collection.

In other embodiments, the web-based collection may be something other than a collection of photos, videos and/or audio files. For example, a web-based collection of documents related to a particular event, a web-based collection of emails related to a particular event, a web-based collection of music related to a particular event or genre, or a web-based collection of software applications related to a particular event or genre can utilize the federated ownership features of one or more of the embodiments described previously, while remaining within the spirit and scope of the invention.

Figure 12:
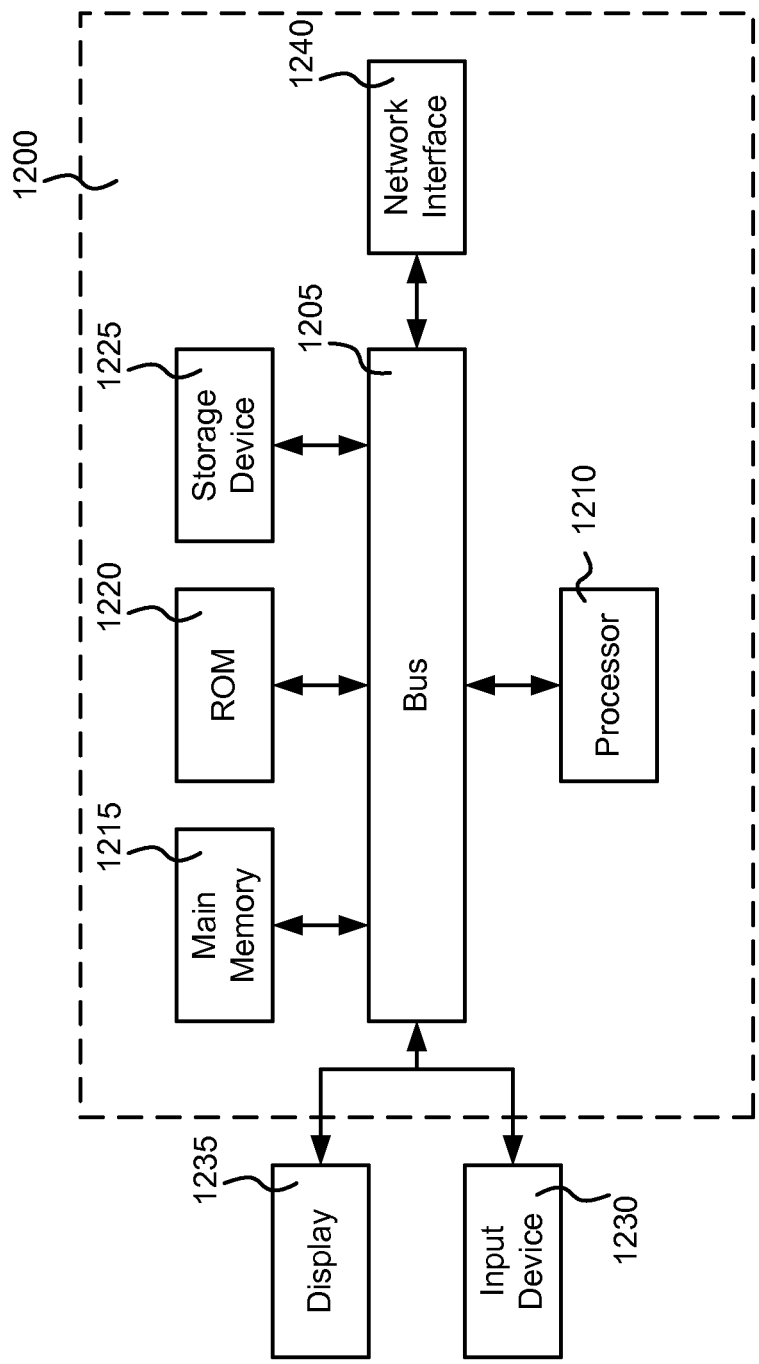
FIG. 12 is a block diagram of a computer system in accordance with an illustrative embodiment.

FIG. 12 is a block diagram of a computer system in accordance with an illustrative implementation. The computer system or computing device 1200 can be used to implement the user devices 1206, the online social network system 1210, and/or the server 1100, etc. The computing system 1200 includes a bus 1205 or other communication component for communicating information and a processor 1210 or processing circuit coupled to the bus 1205 for processing information. The computing system 1200 can also include one or more processors 1210 or processing circuits coupled to the bus for processing information. The computing system 1200 also includes main memory 1215, such as a random access memory (RAM) or other dynamic storage device, coupled to the bus 1205 for storing information, and instructions to be executed by the processor 1210. Main memory 1215 can also be used for storing position information, temporary variables, or other intermediate information during execution of instructions by the processor 1210. The computing system 1200 may further include a read only memory (ROM) 1210 or other static storage device coupled to the bus 1205 for storing static information and instructions for the processor 1210. A storage device 1225, such as a solid state device, magnetic disk or optical disk, is coupled to the bus 1205 for persistently storing information and instructions.

The computing system 1200 may be coupled via the bus 1205 to a display 1235, such as a liquid crystal display, or active matrix display, for displaying information to a user. An input device 1230, such as a keyboard including alphanumeric and other keys, may be coupled to the bus 1205 for communicating information and command selections to the processor 1210. In another implementation, the input device 1230 has a touch screen display 1235. The input device 1230 can include a cursor control, such as a mouse, a trackball, or cursor direction keys, for communicating direction information and command selections to the processor 12610 and for controlling cursor movement on the display 1235.

According to various implementations, the processes described herein can be implemented by the computing system 1200 in response to the processor 1210 executing an arrangement of instructions contained in main memory 1215. Such instructions can be read into main memory 1215 from another computer-readable medium, such as the storage device 1225. Execution of the arrangement of instructions contained in main memory 1215 causes the computing system 1200 to perform the illustrative processes described herein. One or more processors in a multi-processing arrangement may also be employed to execute the instructions contained in main memory 1215. In alternative implementations, hard-wired circuitry may be used in place of or in combination with software instructions to effect illustrative implementations. Thus, implementations are not limited to any specific combination of hardware circuitry and software.

Although an example computing system has been described in FIG. 12, implementations of the subject matter and the functional operations described in this specification can be implemented in other types of digital electronic circuitry, or in computer software embodied on a tangible medium, firmware, or hardware, including the structures disclosed in this specification and their structural equivalents, or in combinations of one or more of them.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. The subject matter described in this specification can be implemented as one or more computer programs, i.e., one or more modules of computer program instructions, encoded on one or more computer storage media for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium is both tangible and non-transitory.

The operations described in this specification can be performed by a data processing apparatus on data stored on one or more computer-readable storage devices or received from other sources.

The term "data processing apparatus" or "computing device" or "processing circuit" encompasses all kinds of apparatus, devices, and machines for processing data, including by way of example a programmable processor, a computer, a system on a chip, or multiple ones, a portion of a programmed processor, or combinations of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method of determining which users are allowed to add content into a web-based collection and to view content from the web-based collection, the content including at least one of a photo and a video, the method comprising:
   receiving, by a processor as output by an administrator of the web-based collection, a list of users who are authorized to provide content onto a website;
   receiving, by the processor, a first request from a first user to provide the content to the website, wherein the content is associated with an event attended by people;
   determining, by the processor, whether the first user making the first request is on the list of users, and if so, allowing the first user to provide the content to the website;
   receiving, by the processor, a second request from a second user to view the content on the website;
   determining, by the processor, whether the second user is on the list of users or is associated with any user on the list of users;
   if the determining is that the second user is on the list of users or is associated with any user on the list of users, allowing the second user to view the content on the website, and if not, disallowing the second user to view the content on the website;
   performing facial image recognition on the content to identify one or more of the people that attended the event, wherein the facial image recognition is performed based on user consent; and
   providing an invitation to view the content to the one or more of the people that are identified as having attended the event based on performing the facial image recognition.

2. The method of claim 1, wherein the list of users corresponds to the people that attended the event.

3. The method of claim 1, wherein the list of users includes permission for the first user to provide the content to the website and to view the content and the list of users includes permission for the second user to view the content.

4. The method of claim 1, wherein the website is a first website and further comprising importing the list of users from an event website that manages information associated with the event.

5. The method of claim 1, wherein the invitation includes a description of the content and a link to a registration page.

6. The method of claim 1, wherein the invitation is a first invitation and further comprising:
   determining that the second user is within a first degree of association with any user on the list of users; and
   providing a second invitation to view the content to the second user based on the second user being within the first degree of association, the second invitation including the first degree of association as a reason why the second user received the invitation.

7. The method of claim 1, wherein performing facial image recognition includes obtaining facial parameters for each person in the content and comparing the facial parameters to facial information for known users in a database.

8. The method of claim 1, further comprising:
   confirming based on time and location information from one or more user devices associated with the one or more of the people that the one or more people attended the event.

9. A non-transitory computer storage medium encoded with a computer program, the computer program comprising instructions that, when executed by one or more processors, cause the one or more processors to perform operations comprising:
   receiving as output by an administrator of a web-based collection, a list of users who are authorized to provide content onto a website;
   receiving a first request from a first user to provide the content to the website, wherein the content is associated with an event attended by people;
   determining whether the first user making the first request is on the list of users, and if so, allowing the first user to provide the content to the website;
   receiving a second request from a second user to view the content on the website;
   determining whether the second user is on the list of users or is associated with any user on the list of users;
   if the determining is that the second user is on the list of users or is associated with any user on the list of users, allowing the second user to view the content on the website, and if not, disallowing the second user to view the content on the website;
   performing facial image recognition on the content to identify one or more of the people that attended the event, wherein the facial image recognition is performed based on user consent; and
   providing an invitation to view the content to the one or more of the people that are identified as having attended the event based on performing the facial image recognition.

10. The computer storage medium of claim 9, wherein the list of users corresponds to the people that attended the event.

11. The computer storage medium of claim 9, wherein the list of users includes permission for the first user to provide the content to the website and to view the content and the list of users includes permission for the second user to view the content.

12. The computer storage medium of claim 9, wherein the website is a first website and further comprising importing the list of users from an event website that manages information associated with the event.

13. The computer storage medium of claim 9, wherein the invitation includes a description of the content and a link to a registration page.

14. The computer storage medium of claim 9, wherein the invitation is a first invitation and the operations further comprise:
   determining that the second user is within a first degree of association with any user on the list of users; and
   providing a second invitation to view the content to the second user based on the second user being within the first degree of association, the second invitation including the first degree of association as a reason why the second user received the invitation.

15. A system comprising:
one or more hardware processors; and
a determining engine stored on a memory and executed by the one or more hardware processors, the determining engine configured to receive as output by an administrator of a web-based collection, a list of users who are authorized to provide content onto a website, receiving a first request from a first user to provide the content to the website, wherein the content is associated with an event attended by people, determine whether the first user making the first request is on the list of users, receive a second request from a second user to view the content on the website, and determine whether the second user is on the list of users or is associated with any user on the list of users;
an access/non-access engine stored on the memory and executed by the one or more hardware processors, the access/non-access engine configured to allow the first user to provide the content to the website if the first user is on the list of users, to allow the second user to view the content on the website if the second user is on the list of users or is associated with any user on the list of users, and disallow the second user to view the content on the website if the second user is absent from the list of users or is not associated with any user on the list of users; and
a facial recognition engine stored on the memory and executed by the one or more hardware processors, the facial recognition engine configured to perform facial image recognition on the content to identify one or more of the people that attended the event, wherein the facial image recognition is performed based on user consent;
wherein the access/non-access engine provides an invitation to view the content to the one or more of the people that are identified as having attended the event based on performing the facial image recognition.

16. The system of claim 15, wherein the list of users corresponds to the people that attended the event.

17. The system of claim 15, wherein the list of users includes permission for the first user to provide the content to the website and to view the content and the list of users includes permission for the second user to view the content.

18. The system of claim 15, wherein the website is a first website and further comprising importing the list of users from an event website that manages information associated with the event.

19. The system of claim 15, wherein the invitation includes a description of the content and a link to a registration page.

20. The system of claim 15, wherein:
the invitation is a first invitation;
the determining engine is further configured to determine that the second user is within a first degree of association with any user on the list of users; and
the access/non-access engine is further configured to provide a second invitation to view the content to the second user based on the second user being within the first degree of association, the second invitation including the first degree of association as a reason why the second user received the invitation.

* * * * *